United States Patent
Xu et al.

(10) Patent No.: US 12,078,154 B1
(45) Date of Patent: Sep. 3, 2024

(54) MICROPLASMA-BASED HEATERLESS, INSERTLESS CATHODE

(71) Applicant: Board of Trustees of The University of Alabama, for and on behalf of The University of Alabama in Huntsville, Huntsville, AL (US)

(72) Inventors: Kunning Gabriel Xu, Brownsboro, AL (US); Ryan Patrick Gott, Summerville, SC (US)

(73) Assignee: The Board of Trustees of the University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 0 days.

(21) Appl. No.: 16/153,297

(22) Filed: Oct. 5, 2018

Related U.S. Application Data

(60) Provisional application No. 62/568,505, filed on Oct. 5, 2017.

(51) Int. Cl.
| | |
|---|---|
| *F03H 1/00* | (2006.01) |
| *B64G 1/40* | (2006.01) |
| *H01J 1/02* | (2006.01) |

(52) U.S. Cl.
CPC ........... *F03H 1/0087* (2013.01); *B64G 1/405* (2013.01); *F03H 1/0018* (2013.01); *H01J 1/025* (2013.01)

(58) Field of Classification Search
CPC ........ H01J 1/025; B64G 1/405; F03H 1/0025; F03H 1/0087
See application file for complete search history.

(56) References Cited

U.S. PATENT DOCUMENTS

| | | |
|---|---|---|
| 8,928,230 B2 | 1/2015 | Watson |
| 8,994,271 B2 | 3/2015 | Kindel |
| 9,006,976 B2 | 4/2015 | Watson |
| 9,384,947 B2 | 7/2016 | Watson |
| 9,406,485 B1 | 8/2016 | Cheng |
| 9,414,478 B2 | 8/2016 | Schultz |
| 9,460,884 B2 | 10/2016 | Hopwood |
| 9,521,736 B2 | 12/2016 | Jacofsky |
| 9,550,694 B2 | 1/2017 | Boughton |
| 9,558,918 B2 | 1/2017 | Watson |
| 9,764,954 B2 | 9/2017 | Walters |
| 9,934,929 B1 | 4/2018 | Martinez et al. |
| 10,032,609 B1 | 7/2018 | Cheng |

(Continued)

OTHER PUBLICATIONS

Bardos, "Radio frequency hollow cathodes for the plasma processing technology" (Year: 1996).*

(Continued)

*Primary Examiner* — Arun Goyal
*Assistant Examiner* — William L Breazeal
(74) *Attorney, Agent, or Firm* — Butler Snow LLP; Jon E. Holland

(57) ABSTRACT

The present disclosure generally pertains to devices and methods for generating thrust in vehicles, for instance in space applications. A heaterless, insertless hollow cathode utilizes AC and pulsed DC electric fields to ionize the propellant gas and generate a plasma plume. The cathode uses an argon microplasma generated in a quartz tube with a tungsten filament and brass ion collector. Free electrons are then drawn from the plasma plume and supplied to a thruster engine.

17 Claims, 5 Drawing Sheets

(56) References Cited

U.S. PATENT DOCUMENTS

| | | | |
|---|---|---|---|
| 10,064,263 B2 | 8/2018 | Watson | |
| 10,167,220 B2 | 1/2019 | Boughton | |
| 10,269,526 B2 | 4/2019 | Martinez | |
| 10,480,493 B2 | 11/2019 | Hofer | |
| 10,672,602 B2 | 6/2020 | Williams | |
| 10,919,649 B2 | 2/2021 | Conversano | |
| 11,042,027 B2 | 6/2021 | Neophytou | |
| 2005/0012441 A1* | 1/2005 | Schulteiss | H01J 1/025 313/141 |
| 2009/0066212 A1* | 3/2009 | Matacotta | H01J 1/025 313/231.31 |
| 2010/0175987 A1 | 7/2010 | Creyghton | |
| 2011/0165333 A1 | 7/2011 | Gasworth | |
| 2011/0309049 A1* | 12/2011 | Papasouliotis | H01J 37/32412 427/523 |
| 2012/0080995 A1* | 4/2012 | Yamamura | H01T 13/16 313/141 |
| 2012/0117938 A1* | 5/2012 | Barral | F03H 1/0075 60/202 |
| 2014/0090357 A1* | 4/2014 | Zurbach | F03H 1/0087 60/202 |
| 2014/0188071 A1 | 7/2014 | Jacofsky | |
| 2015/0094647 A1 | 4/2015 | Kalghatgi | |
| 2015/0157870 A1 | 6/2015 | Kalghatgi | |
| 2016/0089545 A1 | 3/2016 | Juluri | |
| 2016/0121134 A1 | 5/2016 | Kalghatgi | |
| 2017/0032944 A1 | 2/2017 | Jacofsky | |
| 2017/0181260 A1 | 6/2017 | Corke | |
| 2018/0226217 A1 | 8/2018 | Martinez | |

OTHER PUBLICATIONS

Schatz, et al., "Heaterless Ignition of Inert Gas Ion Thrusters Hollow Cathodes," NASA, AIAA/DGLR/JSASS 18th International Electric Propulsion Conference, P. AIAA-85-2008, 1985.

Ashton, et al., "Hollow Cathode Startup Using a Microplasma Discharge," Review of Scientific Instruments, vol. 52, Aug. 1981, pp. 1259-1260.

Vekselman, et al., "Characterization of a Heaterless Hollow Cathode," Journal of Propulsion and Power, vol. 29, 2013, pp. 475-486.

Rubin, et al., "Hollow Cathode Conditioning and Discharge Initiation," Journal of Applied Physics, vol. 104, 2008.

Goebel et al., Fundamentals of Electric Propulsion: Ion and Hall Thrusters, John Wiley and Sons, 2008.

Xu, et al., U.S. Appl. No. 17/033,219, entitled, "Continuous Large Area Cold Atmospheric Pressure Plasma Sheet Source," filed Sep. 25, 2020.

* cited by examiner

MICROPLASMA-BASED HEATERLESS, INSERTLESS CATHODE

CROSS REFERENCE TO RELATED APPLICATION

This application claims priority to U.S. Provisional Patent Application No. 62/568,505, entitled "Development of a Microplasma-Based Heaterless, Insertless Cathode" and filed on Oct. 5, 2017, which is incorporated herein by reference.

RELATED ART

Electric propulsion systems have been long-used in space applications to provide thrust to vehicles such as satellites. Electric propulsion systems such as ion engines and Hall effect thrusters require an electron source to function. The most common source of electrons in conventional electric propulsion systems is a therm ionic hollow cathode containing an insert made up of a therm ionic (electron-emitting) element. A therm ionic hollow cathode (also referred to as an insert hollow cathode) generally functions by applying heat to the therm ionic element so as to cause emission of electrons from the therm ionic material, which further causes ionization of a working gas to develop a plasma, from which free electrons are extracted. The electrons may then be used by ion engines, Hall thrusters, and the like, to produce an ionized plasma for thrust.

Commonly-used therm ionic materials include Tungsten-impregnated Barium Oxide (Barium Oxide) and Lanthanum Hexaboride ($LaB_6$), both of which must reach a high temperature (1600-2000° C.) to produce electrons. Therm ionic emitters are also known to degrade over time and are sensitive to exposure to impurities or ambient particulates such as oxygen or water. Because of this degradation, a conventional therm ionic hollow cathode inevitably has a limited useful life.

Conventional therm ionic hollow cathodes suffer from other major drawbacks when used in space applications. Initially, the resistive heaters that are necessary to achieve temperatures for therm ionic emission require a significant amount of electrical power. This power requirement is too high for power-limited systems, such as small-sized satellites. In a conventional arrangement, this heater may take the form of a coaxial heating element wrapped around the tube containing the emissive material. When a current is passed through the heating element, resistive or ohmic heating occurs and raises the temperature of the emissive material via thermal conduction and radiation. This type of conventional heating element requires tremendous amounts of power to raise the temperature of the emissive element (in the case of Barium Oxide or Lanthanum Hexaboride, to approximately 1600-2000° C.). Further, the heater may take a significant amount of time (e.g., 10-60 minutes) to warm up to its starting operational temperature. This long start-up time is problematic for on-demand applications such as orbit corrections, which require rapid response. The hollow cathode also requires a constant propellant flow during heater warm up, which results in a waste of stored propellant.

Once operational, a heating element may experience further problems. First, the heating element must necessarily run hotter than the temperature at which the therm ionic material emits, forcing the entire hollow cathode to operate at consistently high temperatures. Further, a heating element may act as yet another potential failure point in a system that is susceptible to problems such as material degradation and electrical shorts when running at high temperatures.

Various methods and apparatuses have been introduced in an effort to overcome these obstacles. One example is an arc start cathode, an implementation of the conventional hollow cathode system that removes the heating element. Instead of using a resistive heater, the therm ionic material is heated by an arc that is generated between electrodes. The arc transfers large amounts of energy to heat the therm ionic material quickly (e.g., 20-30 seconds), leading to a relatively fast start of the hollow cathode. However, this solution requires a very large amount of power to initiate and sustain the arc each time the system is started, and further requires that a high amount of energy be maintained in order to keep the system in a condition of readiness. The high energy arc can also cause damage to the cathode, such assputtering and ablation of the cathode surfaces, which shortens the lifetime of the cathode. Further, this solution suffers from the same degradation issues experienced by therm ionic materials in conventional cathodes.

There is, therefore, a need in the art for a solution that reduces power requirements and minimizes startup time, as well as the known failure and degradation points of a therm ionic hollow cathode.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to devices and methods for generating thrust in vehicles, for instance in spacecraft. A hollow cathode containing an electric filament is filled with a propellant gas. The exemplary embodiment lacks a heater element. Instead, direct current (DC), pulsed direct current (PDC), alternating current (AC), and/or radio frequency (RF) energy are applied to the electric filament, thereby ionizing the propellant gas and generating free electrons. In one exemplary embodiment, the cathode uses an argon microplasma generated in a quartz tube with a tungsten filament and a brass ion collector. In another exemplary embodiment, the hollow cathode is made up of entirely (or nearly entirely) inert materials such as quartz, nickel alloys, and/or ceramics. The use of inert materials allows the exemplary system to be used with otherwise corrosive propellants, including iodine.

Figure 1:
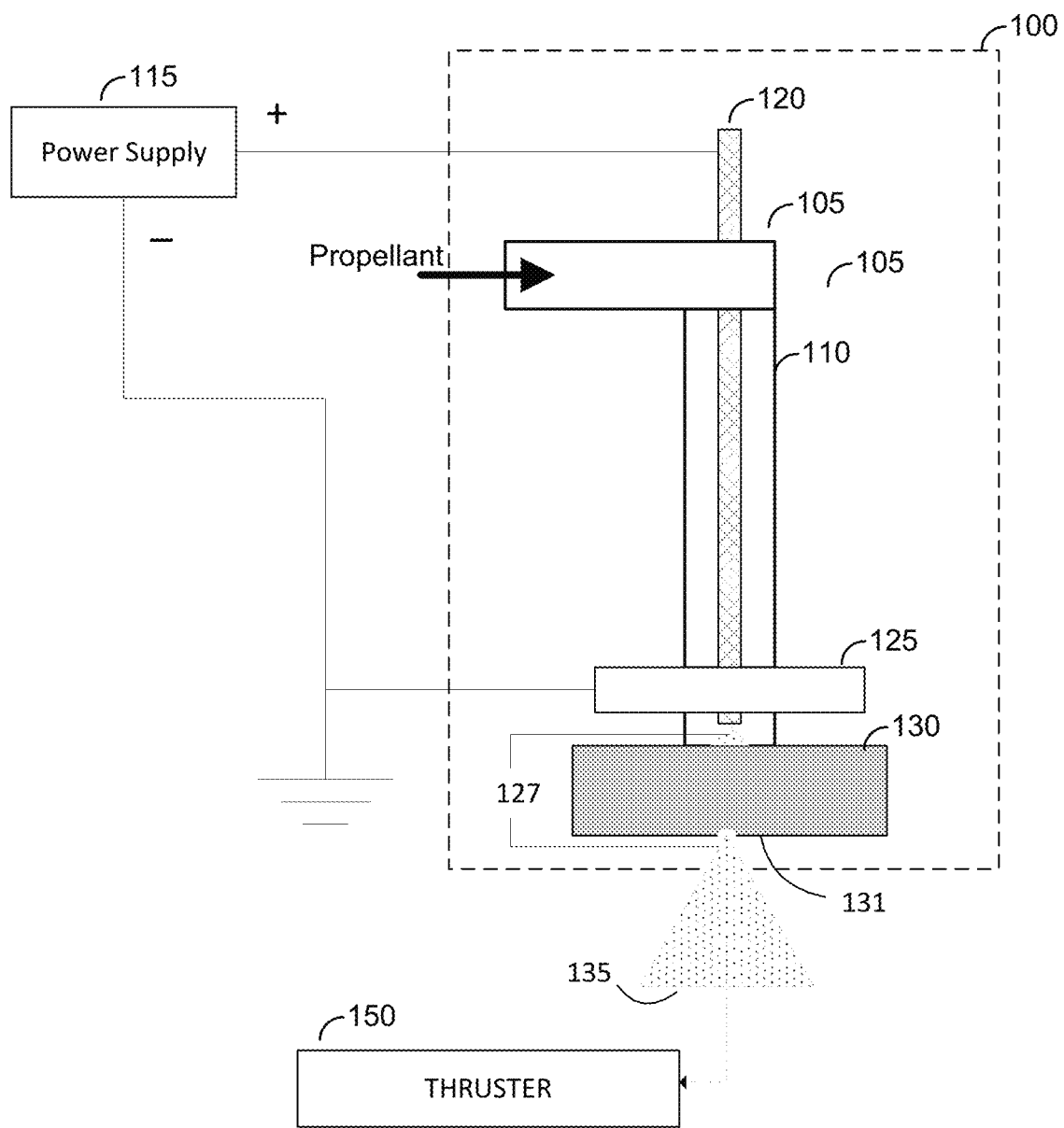
FIG. 1 is a diagram depicting a hollow cathode for use in an electric propulsion system, in accordance with an exemplary embodiment of the disclosure.

FIG. 1 depicts an exemplary embodiment of a hollow cathode 100 for use on a vehicle, for example, a small spacecraft such as a satellite, e.g., a CubeSat satellite. As shown by FIG. 1, the hollow cathode 100 has a hollow tube through which an electrical pin 120 or other type of electric filament passes. The cathode 100 is used with a storage tank (not shown), or other container, that stores a propellant. The propellant is released from the tank as a gas through a valve, and enters the hollow tube 110 of the cathode 100 through an intake tube 105 (as shown by the arrow labeled "Propellant"). In the embodiment of FIG. 1, the gas propellant is a neutral gas such as argon, however, as described in greater detail below, any of a variety of propellants may be used.

The intake tube 105 is an entry point through which a propellant gas may enter the hollow cathode 100. In some embodiments, the intake tube 105 may take the form of a T-fitting or alternate pipe fitting, but any mechanism for ingress of the gaseous propellant may be used. The intake tube 105 may be made of Teflon or PVC in some embodiments, or other materials as appropriate.

The hollow tube 110 of the cathode 100 may be made of quartz, which is a relatively non-reactive (inert) material. A preferred embodiment uses a clear quartz, however a colored quartz or other opaque dielectric material may be alternately used, to no detrimental effect. While the hollow tube 110 can be implemented in any practicable shape, it is shown to be cylindrical in the embodiments depicted by FIGS. 1 and 2. An electrical pin 120 is situated in the quartz tube 110 so as to contact the propellant gas. In the exemplary embodiment of FIG. 1, the electrical pin is a tungsten filament. In alternative embodiments, the pin may be made of nickel, or another material resistant to corrosion.

In an alternate embodiment, the electrical pin 120 may be further enclosed in a second sealed tube within the hollow tube 110. The second sealed tube may be smaller in diameter than the hollow tube 110, such that an annular region is formed between the nested tubes, through which the propellant gas may flow. This embodiment prevents direct contact between the electrical pin 120 and the propellant gas.

The electrical pin 120 serves as an electrode that is electrically connected to a power supply 115 located externally to the hollow tube 110. The power supply 115 may be DC, PDC, AC, or RF energy. A pulsed directed current (PDC) may be implemented, for example, by circuitry for controlling the output of a DC power source (e.g., a battery), so as to provide a pulse (on/off) output at a certain rate, i.e., a pulse controller. The power supply 115 is also electrically connected to a collar 125, which serves as another electrode that is physically separated from the electrical pin 120 but is sufficiently close that the electromagnetic field created by the power supply 115 is generated between the electrical pin 120 and the collar 125. In a preferred embodiment, the collar 125 is a stainless steel ring housed around the outside of the hollow tube 110, and the electrical pin 120 passes through the collar 125. However, in an alternative embodiment, the collar 125 may be made of nickel or a nickel alloy, and/or the collar 125 may take any of a variety of shapes. It will be noted that the collar 125 is external to the hollow tube 110 and does not come into contact with the propellant filling the hollow tube or with the formed plasma (described below). The current passing through the electrical pin 120 is sufficiently strong such that the propellant passing through the hollow tube 110 is converted into plasma at an end of the electrical pin 120 near an ion collector 130.

As shown by FIG. 1, the ion collector 130 sits against one end of the quartz tube 110. The ion collector 130 may be, in one embodiment, a compression cap fitting (e.g., a cap nut). In a preferred embodiment, the ion collector 130 acts as a mechanism to seal the quartz tube 110, however, other embodiments may include a sealing element separate from the ion collector 130. A hole 131 is formed in the front face of the ion collector 135, acting as an orifice from which electrons are extracted. The front face of the ion collector may preferably be made of stainless steel or nickel alloy.

Figure 2:
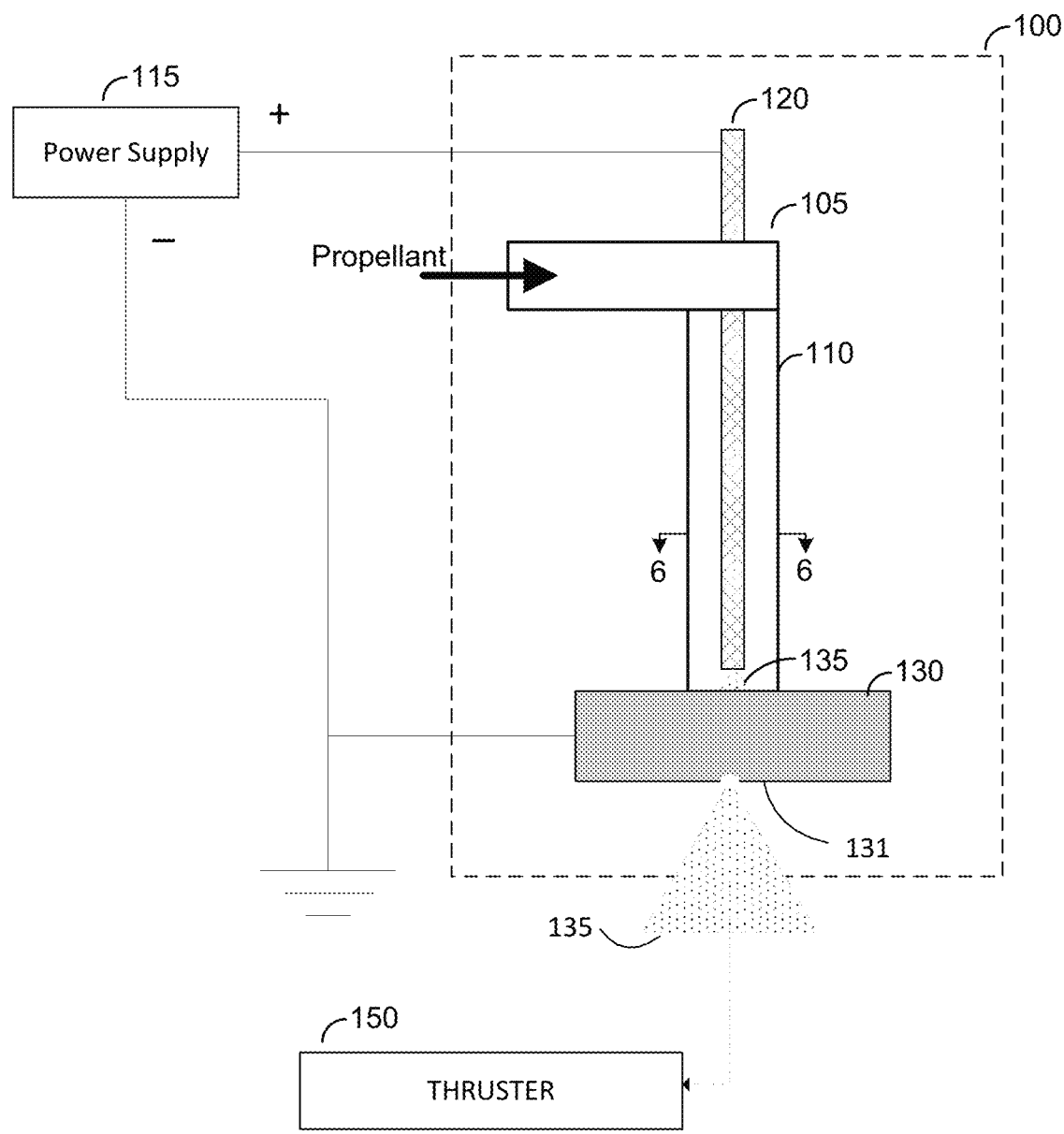
FIG. 2 is a diagram depicting a hollow cathode for use in an electric propulsion system, in accordance with an alternate embodiment of the disclosure.

In an alternate embodiment illustrated in FIG. 2, the stainless steel (or nickel) plate of the ion collector 130 may itself be electrically connected to the power supply 115 in place of the collar 125, such that the ion collector 130 acts as an electrode similar to the collar 125 of FIG. 1. As FIG. 2 depicts, this embodiment is a simplified structure of the hollow cathode 100 that does not include the collar 125 at all.

Figure 5:
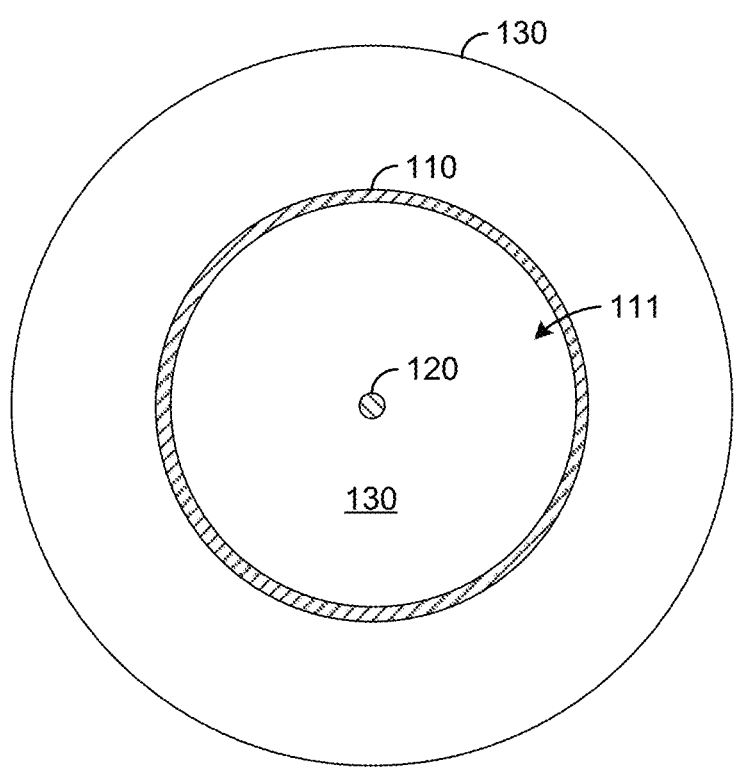
FIG. 5 is a cross-sectional view of a hollow cathode, such as is depicted by FIG. 2.

FIG. 5 shows a cross-sectional view of the hollow tube 110. As shown by FIG. 5, the electrical pin 120 is situated within a hollow region 111 of the tube 110 through which the propellant passes and makes contact with the electrical pin 120. The ion collector 130 has a hollow region into which free electrons flow and are collected. As described above, the ion collector 130 has a hole through which the collected ions may egress from the ion collector 130 for use by a thruster (not shown in FIG. 5).

Figure 3A:
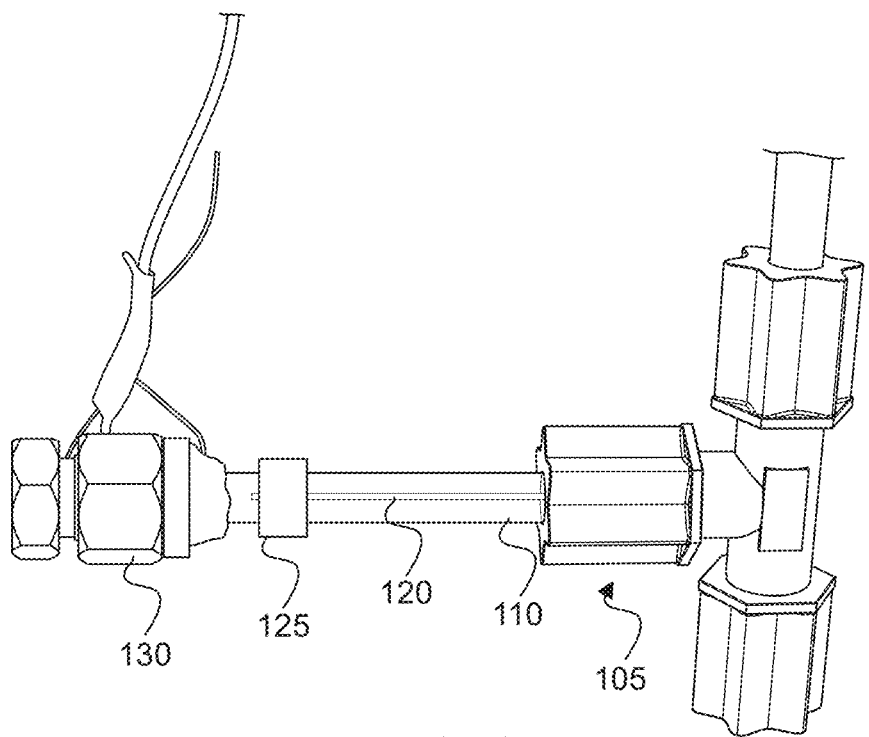
FIG. 3A is a side view of a hollow cathode for use in an electric propulsion system, in accordance with an exemplary embodiment of the disclosure.
Figure 3B:
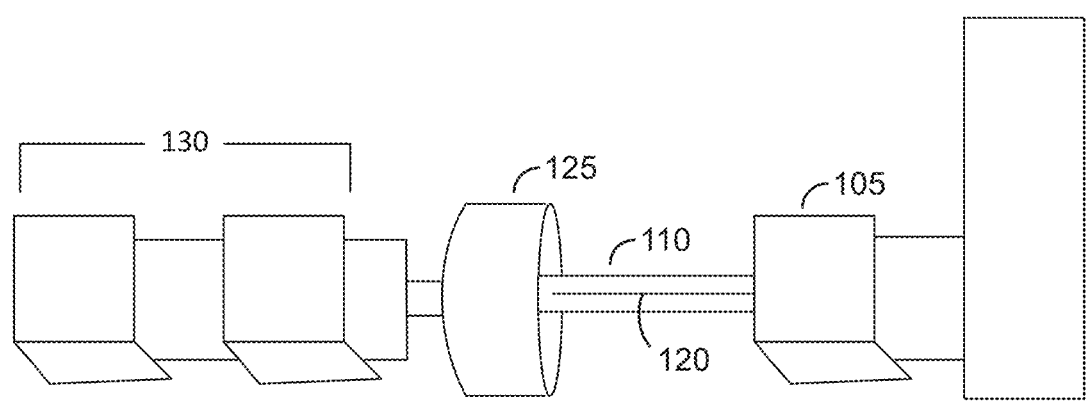
FIG. 3B is a block diagram depicting the elements of the hollow cathode of FIG. 3A.

FIGS. 3A and 3B provide another view of an exemplary hollow cathode 100 shown in FIG. 1. FIG. 3A is a side view of a functioning cathode 100, and FIG. 3B is a graphical representation of the cathode depicted in FIG. 3A. The cathode shown in FIGS. 3A and 3B is arranged horizontally, from right to left, as follows. At the rightmost side of FIGS. 3A and 3B, vertical and horizontal connectors are arranged to form an intake tube 105 (FIG. 1) for allowing the ingress of the gaseous propellant. Adjacent to the left of the depicted horizontal connector is a clear quartz tube (hollow tube 110) containing a tungsten filament (electrical pin 120). A cylindrical stainless steel collar 125 is positioned around the quartz tube 110. Finally, an ion collector 130 is positioned at the left end of the quartz tube 110 (to the left of the collar 125). The ion collector 130 is configured with an orifice 131 (a hole) drilled into its front face (not shown in FIGS. 3A and 3B).

With reference once more to the preferred embodiment shown in FIG. 1 and the implementation shown in FIG. 3B, the hollow cathode 100 is configured to generate electrons as follows. The power supply 115 is electrically connected to both the collar 125 and the electrical pin 120. As the gas propellant is passing through the hollow tube 110, an electrical current (e.g., AC, DC, PDC, or RF) may be applied by the power supply 115 to the electrical pin 120. The application of this current agitates the gaseous propellant, forming a plasma 127 at the tip of the electrical pin 120, within the hollow tube 110, as a plume. An exemplary implementation may use microplasma discharge, which is a small millimeter-scaled plasma generated via DC, PDC, RF, or AC current.

Once the plume of plasma 127 is generated inside the hollow tube 110, the free electrons may be collected out of that plasma. In a preferred embodiment, this collection of the free electrons is done through a known method where a bias-positive electrode is placed outside an orifice 131 on the front plate of the ion collector. This electrode may be placed, for example, at a distance (e.g., two (2) inches) from the orifice 131. The electrode is used to develop an intense electric field near the orifice 131 that draws out and collects electrons 135 from the plasma plume.

Figure 4:
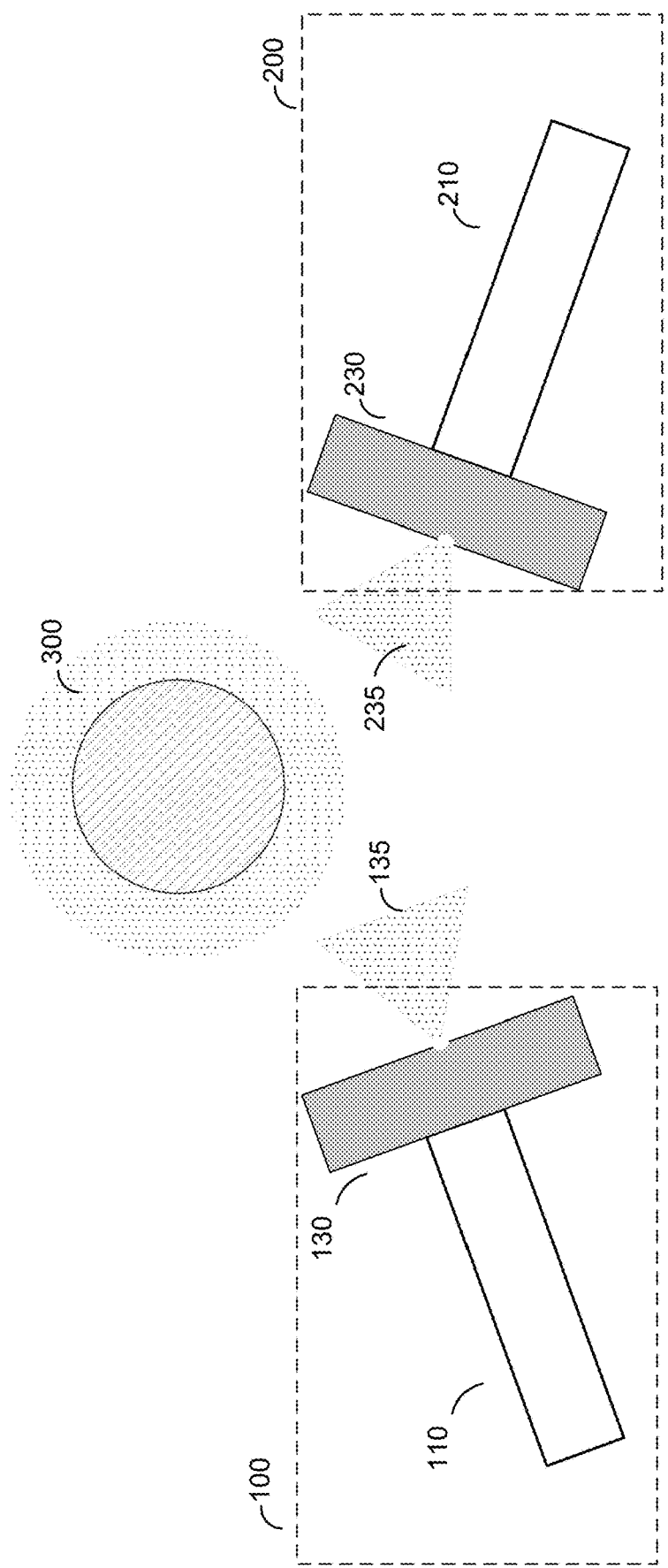
FIG. 4 is a diagram depicting a portion of an electric propulsion system, in accordance with an exemplary embodiment of the disclosure.

FIG. 4 illustrates a portion of such a setup, where a plasma plume has formed at the end of the hollow cathode 100 (on the left side of FIG. 4). Electrons 135 are drawn out of the plume through orifice 131 of the ion collector 130 by the field created by the bias-positive electrode 300. In a preferred embodiment, the electrode 300 illustrated in FIG. 4 may be a component of (or otherwise connected to) a thruster 150 (FIG. 1). The thruster 150 may be, in one embodiment, a conventional Hall thruster or an ion thruster. The electrons 135, after been drawn out of the ion collector 130, are drawn into the thruster 150.

In one embodiment, a single hollow cathode 100 shown in the embodiment of FIG. 1 may be sufficient to provide the requisite amount of electrons to operate an electric propulsion thruster for a small satellite. However, in an alternative arrangement, a plurality of hollow cathodes may be connected to one power source in an array, each functioning independently in an identical manner. FIG. 4, for instance, illustrates a set up with two hollow cathodes 100 and 200, the cathodes being spaced so as to be equidistant from the electrode 300. It will be understood that hollow cathode 200 has the same configuration as hollow cathode 100, with a hollow tube 210, an ion collector 230, and generated electrons 235. When arrayed together, the hollow cathodes 100 and 200 function together in a manner analogous to the single hollow cathode, provided that the power source 115 is sufficiently robust to supply power to both of the cathodes.

The exemplary embodiment shown in FIG. 1 uses argon or xenon as a gas propellant, as such propellants are in common use in conventional hollow cathodes. However, alternate propellants may be used in other embodiments. For example, modern space applications are looking to the use of iodine as a propellant in electric propulsion systems. Because iodine is condensable (it is solid at room temperature), it has a higher storage density than the standard xenon (gaseous) propulsion fuel. Iodine could therefore be stored in as a small space as blocks and vaporized (or sublimed) as needed through the application of heat, rather than being stored as compressed gas in larger volumes (which requires some consumption of energy). Iodine functions similarly to xenon (it may be vaporized through heat and passed through the thrusters to provide propulsion) but consumes less storage space, with minimal loss of performance. This is particularly important on small spacecraft, such as small satellites, where both power supply and available storage area are limited.

Iodine generally cannot be used with conventional hollow cathodes because it is highly corrosive, and will degrade most metals. Conventional hollow cathodes, which contain an emitting material made of Barium Oxide or Lanthanum Hexaboride, are susceptible to degradation by such a corrosive propellant. By contrast, the embodiments illustrated and described herein are insertless, meaning that no therm ionic emitter material (Barium Oxide or Lanthanum Hexaboride) is inserted into the cathode.

The exemplary hollow cathodes may also be made up of entirely inert (or, in some embodiments, minimally reactive) materials. For example, one embodiment uses a hollow tube 110 made of quartz, and a collar 125 and faceplate of the ion collector 130 made of stainless steel, all of which are generally inert. In an alternative embodiment, the stainless steel elements of the system may instead be made up of nickel or nickel alloy, so as to be inert to even the most corrosive materials. The thruster 150 may be made of ceramic and nickel alloys, and is therefore also capable of handling iodine and other corrosive substances. In another alternative embodiment, a ceramic material (also non-reactive) may be used. Because the electric propulsion system described herein is fully non-reactive to iodine, the disclosed systems are therefore capable of handling and ionizing otherwise corrosive propellants, including iodine. The life of such systems is therefore extended beyond those of conventional hollow cathodes, thereby allowing the thrusters to function for a greater duration.

It will be understood the actual material requirements of the system are minimally strict, and that these materials can be selected based on the needs of the particular environment in which the propulsion system will be used. For example, the selection of materials may depend on the propellant to be used, the available space for a storage tank for the propellant, the power supply, the temperatures to which the materials are to be exposed, and the cost of the materials, among other environmental and practical considerations.

In yet another alternate embodiment, alternate or auxiliary propellant gases may be fed into the hollow tube 110 via the intake tube 105, or a plurality of intake tubes 105 may be arranged to feed into the hollow tube 110, each with a different propellant source. By these means, a variety of propellants can be used so as to best align with the materials of the hollow cathode, and the storage area available for the propulsion system.

It will be clear from the embodiments shown in the drawings that the hollow cathode 100 is heaterless, with no separate resistive or other heating element. Rather, the ionization of the propellant is done solely through the application of DC, PDC, AC, or RF power. In some embodiments, the DC power can be operated from approximately 1 to 6 kV at frequencies from about 2 to 10 kHz and pulse widths from about 200 to 1000 ns. AC power may be operated similarly with minimum voltages of about 2-3 kV and minimum frequencies of about 3 kHz to generate currents on the order of 100's of mA. RF power may be at the standard 13.56 MHz and 30-100 W. In other embodiments, other power characteristics (e.g., voltages and frequencies) are possible.

Because the system does not rely upon a heating element, which must be powered on and/or maintained at a certain temperature, the heaterless system has several benefits over a conventional therm ionic implementation. Initially, the startup time of the heaterless system can be reduced to typically less than five (5) seconds—a fraction of that of a conventional cathode. Further, the power requirements of the heaterless system are far lower than those of the conventional therm ionic cathode, allowing for even powered-limited small satellite electric propulsion.

A single hollow cathode, as depicted in the preferred embodiments, has an upper limit on the amount of current that can be output. This is because the generated microplasma requires a particular maximum size (e.g., millimeter scale) to effectively function. Further, because there is no therm ionic material, the only source for electrons is the propellant; therefore, the current produced is limited by the propellant gas itself. The produced current also scales with power and gas flow. However, as described above, it is possible, in an alternate embodiment, to array or stack the described hollow cathodes 100, creating a platform (e.g., cube set platform) capable of generating a larger amount of current.

In the systems and methods described above, the life-limiting therm ionic emitter is removed, thereby removing a potential life-limiting element of the cathode. Secondly, the power consumption of the hollow cathode is improved.

Where resistive heating consumes a significant amount of power in the traditional cathodes, the described system no longer needs to power a heater. Still further, because the disclosed systems may use an alternating or pulsed current, a cyclical pattern of use can be set, reducing the total "on" time during which current is actually being applied. Through these means, the amount of actual current drawn from the system can be reduced, creating a lower-power solution.

Further still, the solution described herein for some embodiments lacks a conventional Barium Oxide or Lanthanum Hexaboride insert, and is made up of entirely inert materials. Because of this, the disclosed systems and methods have a much longer lifetime, with less points of failure, and less elements that are subject to chemical corrosion from the propellant and other adverse environmental conditions.

This disclosure may be provided in other specific forms and embodiments without departing from the essential characteristics as described herein. The embodiments described are to be considered in all aspects as illustrative only and not restrictive in any manner.

Now, therefore, the following is claimed:

1. A heaterless cathode which is insertless comprising:
a power supply configured to supply a current;
a hollow dielectric tube, the hollow dielectric tube has a first end connected to an intake tube and a second end connected to an ion collector,
the intake tube receives a flow of a propellant and directs the flow of the propellant through the first end into the hollow dielectric tube;
an electrode positioned within the hollow dielectric tube, wherein the hollow dielectric tube and the electrode define a volume that extends from around the electrode in the hollow dielectric tube, wherein the flow of the propellant flows through the volume, the electrode being electrically connected to the power supply so as to receive the current from the power supply, wherein the current causes the electrode to generate an electric field that ionizes the flow of the propellant into a plasma as the flow of the propellant is passing through the electric field; and
the ion collector being configured to seal the second end of the hollow dielectric tube except for at least one hole through the ion collector, wherein the ion collector draws the electrons from the plasma out of the second end and through the at least one hole during operation of the heaterless cathode.

2. The heaterless cathode of claim 1, wherein the current is one of an alternating current, a direct current, or a pulsed direct current.

3. The heaterless cathode of claim 2, wherein the alternating current is an RF current.

4. The heaterless cathode of claim 1, wherein the power supply is one of (a) an AC power source, (b) a DC power source, or (c) the DC power source electrically coupled to a pulse controller.

5. The heaterless cathode of claim 4, wherein the AC power source is an RF power source.

6. The heaterless cathode of claim 1, further comprising a metallic collar positioned on an exterior of the hollow dielectric tube, wherein the metallic collar is electrically connected to the power supply.

7. A heaterless cathode comprising:
a power supply configured to supply a current;
a hollow dielectric tube;
an intake tube that receives a flow of a propellant and transfers the flow of the propellant into the hollow dielectric tube;
an electrode positioned within the hollow dielectric tube, wherein the hollow dielectric tube and the electrode define a volume that extends from around the electrode in the hollow dielectric tube, wherein the flow of the propellant flows through the volume, the electrode being electrically connected to the power supply so as to receive the current from the power supply, wherein the current causes the electrode to generate an electric field that ionizes the flow of the propellant into a plasma as the flow of the propellant is passing through the electric field; and
an ion collector positioned at an end of the hollow dielectric tube, the ion collector being configured to seal the end of the hollow dielectric tube except for at least one hole through the ion collector, wherein electrons from the plasma pass through the at least one hole during operation of the heaterless cathode, and wherein the ion collector is electrically connected to a negative terminal of the power supply.

8. The heaterless cathode of claim 1, wherein the hollow dielectric tube is made of quartz.

9. The heaterless cathode of claim 1, wherein the electrode comprises a pin made of one of tungsten or nickel.

10. The heaterless cathode of claim 1, wherein the electrode comprises a filament.

11. The heaterless cathode of claim 1, wherein the ion collector is positioned such that the electrons emitted through the hole are directed to a Hall effect thruster.

12. The heaterless cathode of claim 1, wherein the current is pulsed direct current.

13. A system comprising:
a heaterless cathode which is insertless comprising:
a hollow dielectric tube that receives a flow of a propellant, wherein the hollow dielectric tube has a first end connected to an intake tube and a second end connected to an ion collector; and
an electrode positioned within the hollow dielectric tube, wherein the hollow dielectric tube and the electrode define a volume that extends from around the electrode in the hollow dielectric tube, and wherein the flow of the propellant is directed from the intake tube to the first end and through the volume, the electrode being electrically connected to a power supply so as to receive a current from the power supply, wherein the current from the power supply causes the electrode to generate an electric field that ionizes the flow of the propellant into a plasma as the flow of the propellant passes through the electric field;
the ion collector configured to draw electrons from the plasma out of the second end into the ion collector and the ion collector having at least one orifice for emitting electrons from the plasma; and
a thruster positioned near the at least one orifice of the ion collector for receiving the electrons emitted from the at least one orifice and generating thrust based on the electrons received by the ion collector, wherein the thruster comprises a positively biased electrode.

14. A method of operating a heaterless hollow cathode which is insertless comprising:
providing the heaterless hollow cathode comprising a hollow dielectric tube and an electrode positioned within the hollow dielectric tube, wherein the hollow dielectric tube and the electrode define a volume that extends from around the electrode in the hollow dielectric tube, and wherein the hollow dielectric tube has a first end connected to an intake tube and a second end connected to an ion collector, applying a current to the electrode thereby generating an electric field within the hollow dielectric tube;

directing a flow of a propellant from the intake tube through the first end and the volume such that the flow of the propellant passes through the electric field within the hollow dielectric tube, wherein the electric field ionizes the flow of the propellant into a plasma as the flow of the propellant passes through the electric field;

collecting ions from the plasma with the ion collector, and wherein the collecting comprises drawing the ions out of the second end to the ion collector; and emitting electrons from the plasma through an orifice of the ion collector.

15. The method of claim 14, wherein the hollow dielectric tube and the electrode are made of respective materials that do not react chemically to the propellant.

16. The method of claim 14, further comprising:
receiving the electrons with a thruster; and
generating thrust with the thruster based on the electrons.

17. A system, comprising:
a tank that stores a propellant:
a heaterless hollow cathode which is insertless comprising a hollow dielectric tube having a first end connected to an intake tube and a second end connected to an ion collector and an electrode within the hollow dielectric tube, wherein the hollow dielectric tube and the electrode define a volume that extends from around the electrode in the hollow dielectric tube, wherein the intake tube is coupled to the tank to provide a flow of the propellant from the tank to the first end, and wherein the flow of the is directed through the volume;

a power supply;

wherein the electrode is coupled to the power supply for receiving a current that causes the electrode to generate an electric field within the hollow dielectric tube for ionizing the flow of the propellant into a plasma as the flow of the propellant passes through the electric field within the hollow dielectric tube;

an ion collector positioned to receive the plasma and collect ions from the plasma by drawing the ions out of the second end into the ion collector, the ion collector having a hole for emitting electrons from the plasma; and a Hall effect thruster positioned to receive the electrons emitted from the hole, the Hall effect thruster configured to generate thrust based on the electrons.

* * * * *